April 19, 1927.

G. W. SPANGLER 1,625,689

VALVE STRUCTURE

Filed March 3, 1925

Inventor
G. W. Spangler
By Clarence A. O'Brien
Attorney

April 19, 1927.  
G. W. SPANGLER  
VALVE STRUCTURE  
Filed March 3, 1925  
1,625,689  
2 Sheets-Sheet 2

Inventor  
G. W. Spangler  
By Clarence O'Brien  
Attorney

Patented Apr. 19, 1927.

1,625,689

UNITED STATES PATENT OFFICE.

GEORGE WILLIAM SPANGLER, OF GREENCASTLE, PENNSYLVANIA.

VALVE STRUCTURE.

Application filed March 3, 1925. Serial No. 12,864.

This invention relates to an improved valve structure of the type particularly adapted for use in a fluid pressure supply line, the construction being such as to automatically control the passage of steam through the line according to the pressure built up.

The invention has more particular reference to a structure of this kind wherein a casing is provided, there being a dual arrangement of valves therein and serving to insure proper balancing and to render the structure extremely sensitive to easy operation. External means is associated with the casing for positively closing the valves when an excessive pressure has been reached.

The object, features, and advantages of the invention will be clear from the following description when considered in connection with the accompanying drawings, in which—

Figure 1 is a side elevation of a valve structure constructed in accordance with the present invention.

Fig. 2 is an enlarged vertical cross section taken approximately upon the plane of the line 2—2 of Fig. 1.

Figure 3:
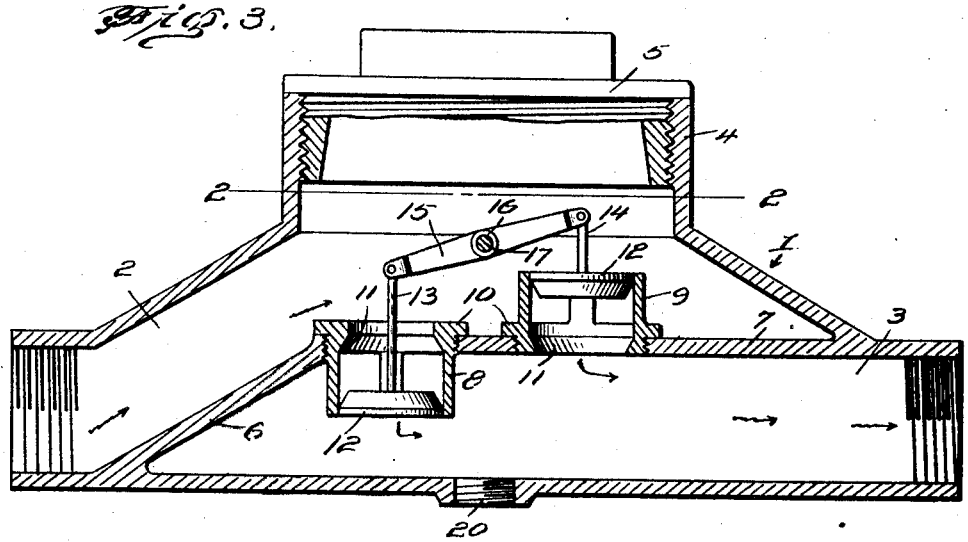
Fig. 3 is a longitudinal section partly in elevation.
Figure 4:
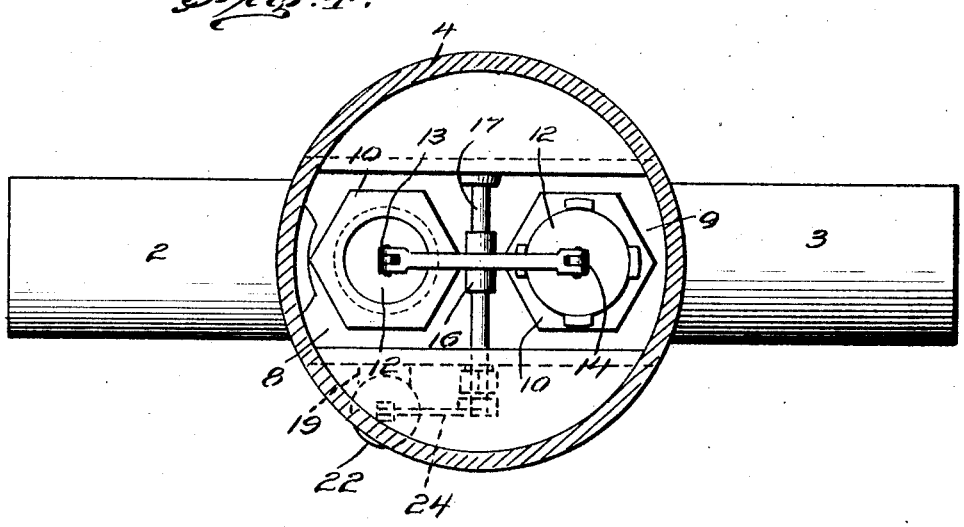
Fig. 4 is a horizontal section taken upon the plane of the line 4—4 of Fig. 3.

Referring to the drawing in detail, the reference character 1 designates generally an appropriate casing which, in the present instance, embodies an internally screw threaded intake 2 at one end and an outlet 3 at its opposite end. These parts are of such construction as to permit the device to be installed in a steam line.

The central upper portion of the casing is set up cylindrical as indicated at 4 and is internally screw threaded to receive a removable closing plug 5. Arranged on the interior of the casing is a partition including an inclined portion 6 at the intake end and horizontal portion 7 at the discharge end. At longitudinally spaced points this partition is formed with screw threaded holes and valve cages 8 and 9 are tapped into the same. Each cage is of open work design and has a flange 10 at one end and a bevelled valve seat 11 at the same end. It will be seen from the top plan view in Fig. 2 that these flanges are substantially hexagonal in configuration to permit use of a common wrench in removing the cages.

Operable in each cage is a mushroom valve 12, the beveled periphery of which is adapted to contract the beveled valve seat in its respective cage. Here, I would direct attention to the fact that the cage 8 is disposed downwardly, that is, depends below the horizontal portion of the partition, while the cage 9 extends above the same. It will also be noted that the stem 13 of the valve in the first named cage is comparatively long while the arm 14 of the remaining valve is comparatively short.

These stems are pivotally connected to the forked ends of a rocker arm 15 fixed as at 16 between its ends to the shaft 17. This shaft has its inner end journaled into a boss socket 18 in the portion 4 of the casing, the opposite end extending through an opening in the wall of the casing to the exterior.

With this arrangement it will be seen that the valves 12 are simultaneously operable, the same being balanced and held open so long as the pressure in the line is equal. Under certain conditions, the valves will be simultaneously closed to permit the pressure to build up and it becomes uniform again.

As before indicated, means is located at the exterior of the valve casing for automatically closing the valves 12 in the event that the pressure in the line reaches an abnormal degree. The means for accomplishing this result is better shown in Figs. 1 and 2, particularly Fig. 2, wherein it will be seen that a small pipe 19 is tapped into the screw threaded port 20 (see Fig. 3) and is connected at its opposite end to an open cap cup 21 forming a cylinder for a sliding piston 22. The stem of the piston extends slidable upwardly through a horizontal flange 23 projecting from one side of the casing and is connected at its top to a crank arm 24 which in turn is connected to the extended portion of the aforesaid shaft 17. Arranged between the flange 23 and the cap of the cylinder are plates 25 and interposed and held between these plates are coiled springs 26, the aggregate tension of which serves to normally maintain the valves open, but which is capable of being overcome by abnormal steam pressure in the line.

If desired, appropriate adjusting means may be associated with the piston stem for varying the tension of the spring.

From the foregoing description it will be seen that in case of the formation of an extensive pressure in the side 3 of the casing, that pressure will back up sufficiently and a portion will be diverted through the pipe 19 to act upon the piston 22, sliding the same vertically to the cylinder 21, overcoming the spring pressure and serving to rock the shaft 17 through the medium of the crank arm 24. In so doing the valves 12 will be seated to cut off the supply through the inlet 2 and to permit the pressure to resume its normal condition.

As before stated the prime feature of the invention is the ideal arrangement permitting ready access to be had to the interior of the casing for repairing, cleaning, etc. With the arrangement shown the closure plug 5 may be removed from the casing to expose the operable parts of the valve. Then, the valves, together with the valve cages, may be removed. The hexagonal shape of the flanges on the cages facilitates such removal.

It is thought that the foregoing description taken in connection with the accompanying drawings will be found sufficient to enable persons skilled in the art to which the invention relates to obtain a clear understanding of the structure, advantages, and features. Therefore a more lengthy description is deemed unnecessary.

Although the preferred embodiment of the invention has been shown and described, it is to be understood that any minor changes coming within the field of invention claimed, may be resorted to if occasion demands.

Having thus described my invention, what I claim as new is:—

In a valve structure of the class described, a new article of manufacture comprising a casing in the form of a single casting, the central portion of which is substantially Y-shaped in cross-section and formed at its top with outstanding segments carrying an upstanding internally screw-threaded flange, the opposite end portions of the casting being cylindrical in cross-section, the portion of the casting between the ends and the aforesaid central portion being gradually increased in height and provided with inclined top portions, an open top cylinder formed on the exterior one side of the casting, and a closure plug cooperable with the aforesaid flange.

In testimony whereof I affix my signature.

GEORGE WILLIAM SPANGLER.